(12) United States Patent
Casarez et al.

(10) Patent No.: US 9,779,638 B2
(45) Date of Patent: Oct. 3, 2017

(54) EDUCATIONAL BUILDING BLOCKS TO MODEL DNA AND RNA STRUCTURES

(71) Applicant: Massachusetts Institute of Technology, Cambridge, MA (US)

(72) Inventors: Bethany Lemanski Casarez, Berkeley, CA (US); John Kim Vandiver, Lexington, MA (US); Kathleen M. Vandiver, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 519 days.

(21) Appl. No.: 14/539,443

(22) Filed: Nov. 12, 2014

(65) Prior Publication Data

US 2016/0133157 A1     May 12, 2016

(51) Int. Cl.
*G09B 23/26*     (2006.01)

(52) U.S. Cl.
CPC ................................. *G09B 23/26* (2013.01)

(58) Field of Classification Search
CPC ....................................................... G09B 23/26
USPC ........ 434/276, 277, 278, 279, 280, 281, 298
See application file for complete search history.

(56) References Cited

U.S. PATENT DOCUMENTS

| | | | | |
|---|---|---|---|---|
| 3,296,714 A | * | 1/1967 | Klotz ...................... | G09B 23/26 434/279 |
| 3,445,940 A | * | 5/1969 | Dziulak ................... | G09B 23/26 434/279 |
| 3,594,924 A | * | 7/1971 | Baker ...................... | G09B 23/26 434/279 |
| 3,802,097 A | * | 4/1974 | Gluck ..................... | G09B 23/26 434/279 |
| 3,854,223 A | * | 12/1974 | Dingman, II .......... | G09B 23/26 434/278 |
| 4,184,271 A | * | 1/1980 | Barnett, Jr. ............ | G09B 23/26 434/279 |
| 6,036,497 A | * | 3/2000 | Langmuir ............... | G09B 23/26 434/279 |
| 6,343,937 B1 | * | 2/2002 | Curtis ..................... | G09B 23/26 434/276 |
| D462,719 S | * | 9/2002 | Guilloton ................ | D19/62 |
| 2003/0170601 A1 | * | 9/2003 | Scheetz .................. | G09B 23/26 434/279 |
| 2012/0196259 A1 | * | 8/2012 | Woodward ............. | G09B 23/26 434/279 |
| 2015/0235568 A1 | * | 8/2015 | Hoelzer .................. | G09B 23/26 434/279 |

OTHER PUBLICATIONS

"Teacher Guide for LEGO DNA set", published 2004, pp. 1-45, 47 pages.
Advertisement for LEGO Life Science education sets, including the DNA set, published 2004, 2 pages.

* cited by examiner

*Primary Examiner* — Kurt Fernstrom
(74) *Attorney, Agent, or Firm* — Sunstein Kann Murphy & Timbers LLP

(57) ABSTRACT

A kit of educational building blocks models nucleic acid structures for use in teaching nucleic acid structures using building blocks that visually represent nucleotides and their components.

8 Claims, 12 Drawing Sheets

EDUCATIONAL BUILDING BLOCKS TO MODEL DNA AND RNA STRUCTURES

TECHNICAL FIELD

The present disclosure relates to educational building blocks, and more particularly to blocks representing nucleotides and components thereof for use in learning environments.

BACKGROUND ART

In academic settings, instructors have used building blocks to teach curriculum. Since modeling kits can be used to demonstrate concepts visually, they provide students with another approach to subject matter, in addition to lectures and independent readings. Moreover, modeling kits may be better suited for highlighting certain features of the subject matter than other representations, such as video or pictures.

SUMMARY OF THE EMBODIMENTS

In accordance with an embodiment of the invention there is provided a kit of educational building blocks that can model a nucleic acid structure The kit includes a plurality of building blocks, including at least first, second, third, and fourth building blocks. Each building block is a structure corresponding to a nucleotide and having visually distinct portions thereof corresponding to (i) a base portion selected from the group comprising adenine, guanine, thymine, and cytosine; (ii) a sugar portion; and (iii) a phosphate group portion.

The sugar portion of this embodiment has two ends corresponding to a 3' end and a 5' end. The phosphate group portion has two ends, and the end of the sugar portion corresponding to the 5' end can be permanently affixed to a first end of the phosphate group portion In this embodiment, in each building block, the end of the sugar portion corresponding to the 3' end has a backbone coupler of a first gender and the second end of the phosphate group portion has a backbone coupler of a second gender; the two backbone couplers share a common longitudinal axis, so that the first and second building blocks can be removably interlinked by using a backbone coupler of the first gender of the first building block to mate with a backbone coupler of the second gender of the second building block to model a sugar-phosphate backbone. Additionally, the mated backbone couplers are configured to permit rotational motion about the longitudinal axis. Furthermore, in this embodiment, in each building block, the portion corresponding to the base has a base coupler of a first gender when the base portion corresponds to guanine or thymine and a second gender when the base portion corresponds to adenine or cytosine, and the base portions and base couplers are configured so that the two bases of the second and third building blocks can be removably coupled in a direction transverse to the longitudinal axis of each of the second and third building blocks, and so that the two bases can remain coupled when their respective building blocks are subject to some rotational motion about their respective longitudinal axes.

Furthermore, in this embodiment, each base portion has a width in the transverse direction. The base portions corresponding to adenine and guanine have a first width, and the base portions corresponding to thymine and cytosine have a second width; so that when the first and second building blocks are interlinked to model a pair of sugar-phosphate backbones, the differing widths and the base couplers are configured so that the base portion in the first building block, when corresponding to thymine, can be coupled with a base portion in the third building block, when corresponding to adenine, and the base portion in the second building block, when corresponding to guanine, can be coupled with the base portion in the fourth building block, when corresponding to cytosine, but wherein coupling of these base portions in any other pairing of base portions is not possible.

Finally, in this embodiment, the backbone couplers and the base couplers are configured, under such conditions, so that when the first and second building blocks are interlinked to model a first sugar-phosphate backbone and the second and third building blocks are interlinked to model a second sugar-phosphate backbone, and are arranged so that opposed base portions of the first and third building blocks and of the second and fourth building blocks are coupled using the base couplers, then the building blocks model a double stranded nucleic acid structure.

A consequence of this embodiment in various configurations is that the portions corresponding to the bases of the nucleotide have two different widths and two different gendered base couplers, and there exist four different configurations of nucleotide base portions. The first gendered base coupler and first width corresponds to guanine. The second gendered base coupler and first width corresponds to adenine. The first gendered base coupler and second width corresponds to thymine. The second gendered base coupler and second width corresponds to cytosine. These respective configurations allow forming a DNA model only with a parallel phosphate-sugar backbone structure and proper base pairing of adenine to thymine and guanine to cytosine. Additionally, the couplers allow bases to be removably coupled and remain coupled when the building blocks are subject to rotational motion.

In a related embodiment of the invention, the backbone couplers are snap-fit couplers, at least in part.

Optionally, in a related embodiment of the invention, the base couplers are configured as a ball-and-socket with a snap fit.

Also in a related embodiment, the disassembly force of the backbone couplers is more than triple the disassembly force of the base couplers.

Optionally, in a related embodiment, the base portion and the sugar portion are discreet components and the base portion is coupled to the sugar portion by a cantilevered snap fit.

In a further related embodiment, the group of building blocks representing the base portion of a nucleotide also contains blocks representing uracil. Optionally, the uracil base portion has dimensions and coupling mechanisms that are equivalent to those of the thymine base portion.

In a further related embodiment of the invention, the kit is configured to model both single and double stranded nucleic acid structures.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
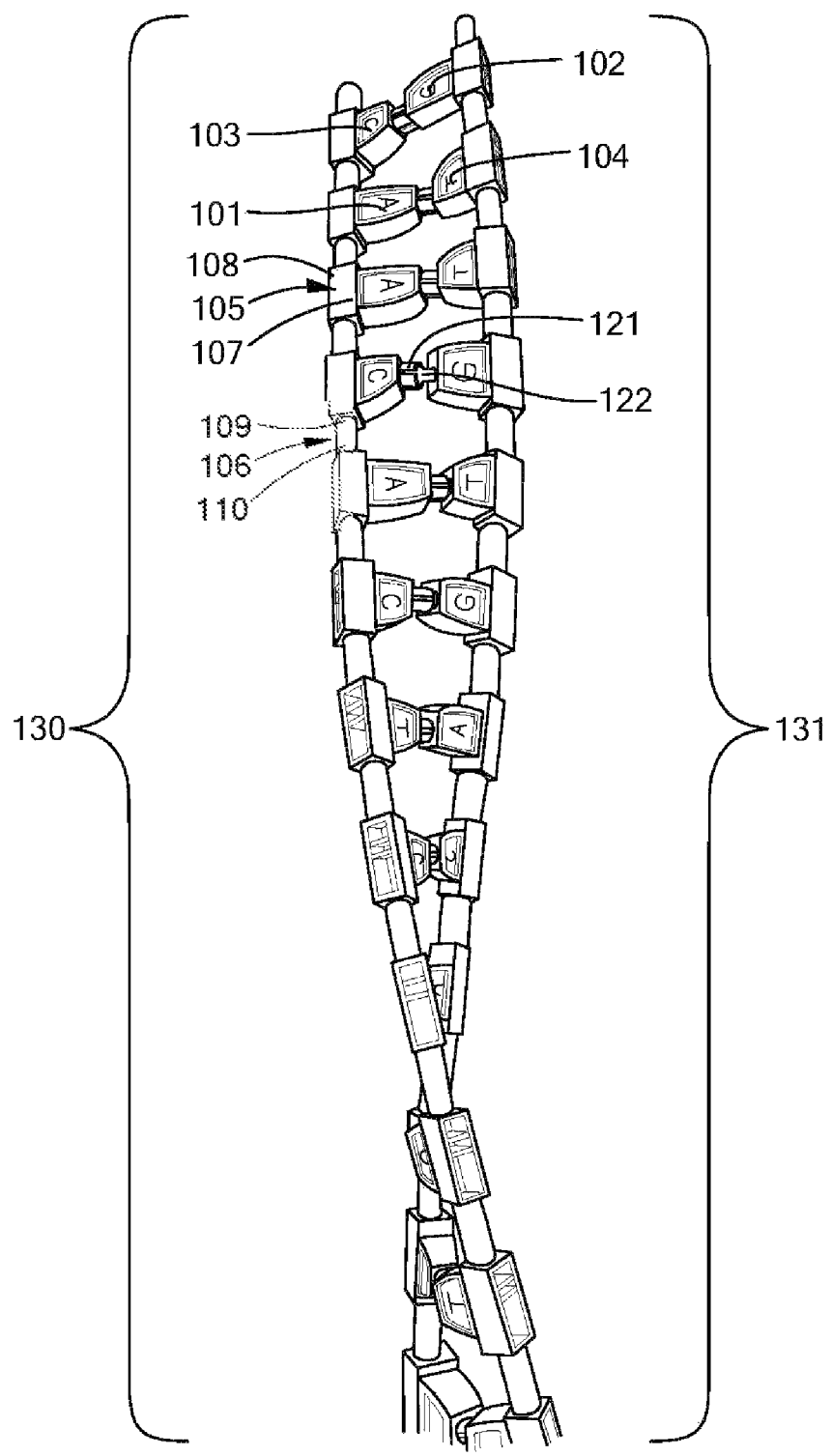
FIG. 1 is a perspective view of an exemplary set of building blocks assembled and arranged to represent a twisting double stranded nucleic acid structure.

Definitions. As used in this description and the accompanying claims, the following terms shall have the meanings indicated, unless the context otherwise requires:

A "backbone coupler" is a coupling device that is a part of a nucleotide building block. Each backbone building block has two backbone couplers of opposite genders sharing a common longitudinal axis. One gender backbone coupler is associated with a sugar portion. The opposite gender backbone coupler is associated with the phosphate group portion, so that building blocks can be removably interlinked using the backbone couplers to model a sugar-phosphate backbone of linked nucleotides.

A "base coupler" is a coupling device associated with a base portion sub-block. The gender of the base coupler depends on the identity of base portion with which it is associated, so that a pyrimidine base sub-block can mate only with a purine base sub-block. A base coupler is sized so that it cannot mate with a backbone coupler and vice versa.

A "base-sugar coupler" is a coupling device associated with a base portion sub-block and a sugar portion. One gender base-sugar coupler is associated with a base portion sub-block and the opposite gender base-sugar coupler is associated with a sugar portion, such that a base portion sub-block and a sugar portion can be removably interlinked in a direction transverse to the longitudinal axis associated with backbone couplers to model a single-stranded linked nucleotide structure.

A "first gender" of a coupler is one of male or female, whereas a "second gender" of a coupler is the other of male or female, so that two couplers of the same type will mate when one is of the first gender and the other is of the second gender.

"Some rotational motion" of a first building block corresponding to a nucleotide is motion of the block about the longitudinal axis at a backbone coupler, to which it is attached, relative to an adjacent block corresponding to another nucleotide and forming a part of a common backbone with the first block, the relative motion occurring to an extent that a when the two blocks form a part of properly assembled group of similar blocks corresponding to nucleotides in a model of a DNA structure, the combined rotational motion of the blocks in the group allows the model to be twisted into a double-helix formation.

The kit of nucleic acid building blocks described herein allows a user to quickly begin modeling nucleic acid structures and their macromolecular functions, such as DNA replication, mRNA transcription, and tRNA translation. Because each building block already includes distinct portions representing the sugar, phosphate group, and base portions of a nucleotide, the user can form a complete representation of a nucleotide with three or fewer distinct components. Moreover, the distinct coloring and form of the sugar, phosphate group, and base portion components informs the user of the structure of a single nucleotide. Since the user can readily identify the different components of each nucleotide, the user can begin modeling structures and functions after removing the building blocks from the kit.

Further, the couplers for the sugar, phosphate group, and base portions are configured so that the forces required to assemble and disassemble connections between various portions correspond generally to the relative forces of those bonds in the nucleic acid structure. For example, the covalent bond formed between a sugar and phosphate is stronger than the hydrogen bond formed between bases. This strength differentiation can be felt by a user when assembling, disassembling, or interacting with the model of nucleic acid structure. In exemplary embodiments, base couplers that represent hydrogen bonds are configured to require joint assembly and disassembly forces of approximately 1 N. Since the sugar-phosphate bonds are stronger, in some embodiments, the joint assembly and disassembly forces for those couplers are configured to range from approximately 5 N to 10 N.

Additionally, the building blocks are configured to make it difficult for the user to assemble a DNA or RNA model incorrectly. In embodiments of the invention, if a user attempts to pair bases improperly, their couplers would fail to connect with one another. In other embodiments of the invention, the base portions are sized so that the total width (in a direction transverse to the longitudinal axis of the backbone couplers) of interlocked adenine and thymine portions equals the total width of interlocked guanine and cytosine portions. If bases are improperly paired, their total width would either exceed or fall short of the standard width. As a result, if a user creates a double helix formation with incorrect base pairs, the widths of the pairings will be non-uniform and produce a misshapen backbone portion of the nucleic acid. The irregularity would signal to the user or an instructor that the building blocks have been assembled incorrectly.

FIG. 1 is a perspective view of an exemplary set of building blocks assembled and arranged to represent a twisting double stranded nucleic acid structure, also known as a double-helix structure. The exemplary set of building blocks includes four visually distinct nucleotide sub-blocks, representing adenine 101, guanine 102, thymine 104, and cytosine 103. The set of building blocks also includes portions representing the sugar portion 105 and the phosphate group portion 106 of a nucleic acid structure.

The sugar portion 105 has two first-gendered ends, a 3' end 107 and a 5' end 108, which couple to the two second-gendered ends of the phosphate group portion block 109, 110 at the backbone couplers to form a backbone 130 of a nucleic acid structure. In an embodiment, the end of the sugar portion corresponding to the 5' end 108 can be permanently affixed to an end of the phosphate group portion 110. The end of the sugar portion block corresponding to the 3' end can reversibly couple to an end of a phosphate group portion block. When two backbones of a nucleic acid structure are formed, linked with base portion sub-blocks, and coupled together through the base couplers on the base portion sub-blocks, then the building blocks can model a double stranded nucleic acid structure.

The base sub-blocks have two opposite gender base couplers 121, 122, where a base sub-block representing guanine 102 or thymine 104 has one gender base coupler 121 and a base sub-block representing adenine 101 or cytosine 103 has the opposite gender base coupler 122. The opposite gender base couplers removably couple to model base-pairing in a nucleic acid structure. Additionally, the base sub-blocks representing adenine 101 and guanine 102 have one width and base sub-blocks representing thymine 104 and cytosine 103 have a second width, so that when the base sub-blocks are paired in a double-stranded nucleic acid structure with sugar-phosphate backbones 130, 131, the differing widths and the base couplers ensure that the adenine sub-block 101 pairs only to the thymine sub-block 104 and the cytosine sub-block 103 pairs only to the guanine sub-block 102.

Although the building blocks are linear components, when the blocks interlock to form a double-helix structure, the structure retains the degrees of freedom necessary to flex in a manner representative of the structure's nature. Additionally, each hydrogen-hydrogen bond represented by the bonding of two base portions in a base pair at the base couplers 121, 122 can be disconnected individually without disrupting the entire nucleic acid structure. In some embodiments, a base portion 101 can be rotated up to 180° around the phosphate-sugar backbone 130 without disrupting the other connectors in the nucleic acid structure. This base portion 101 can rotate with the sugar portion 105 and phosphate group portion 106, thus demonstrating a rotation of a nucleotide within a nucleic acid structure. The combination of all rotational freedoms of the assembled building blocks allows the combination of building blocks to form a double-helix structure.

Figure 2:
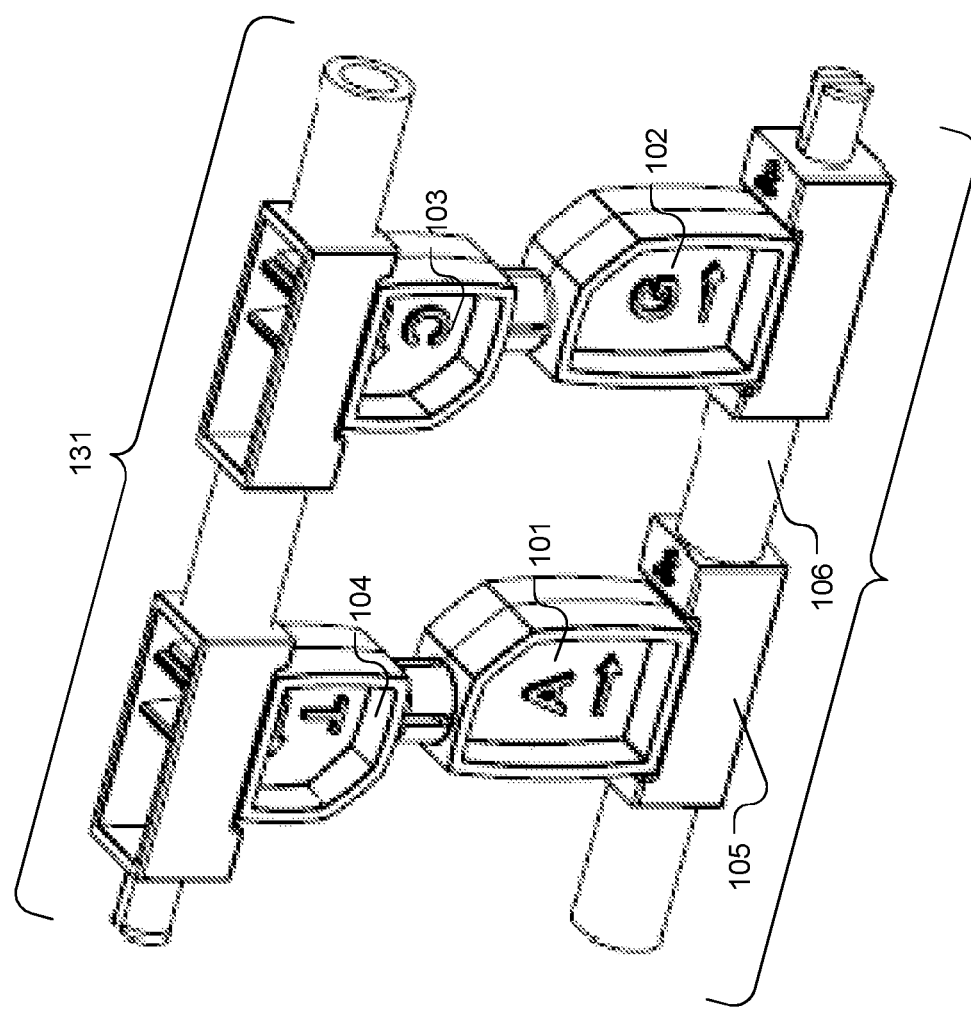
FIG. 2 is a perspective view of another exemplary set of four distinct building blocks, each representing a different nucleotide, assembled to represent a double stranded nucleic acid structure.

FIG. 2 is a perspective view of another exemplary set of four distinct building blocks, each representing a different nucleotide, assembled to represent a double stranded nucleic acid structure Once assembled, the double-helix structure can be laid flat to examine proper assembly of base pairs 102, 103; 101, 104 and backbone structures 130, 131. The flexibility of the backbone building blocks 105, 106 allow the fully assembled structure to both lie flat and to twist into a double-helix structure.

Figure 3:
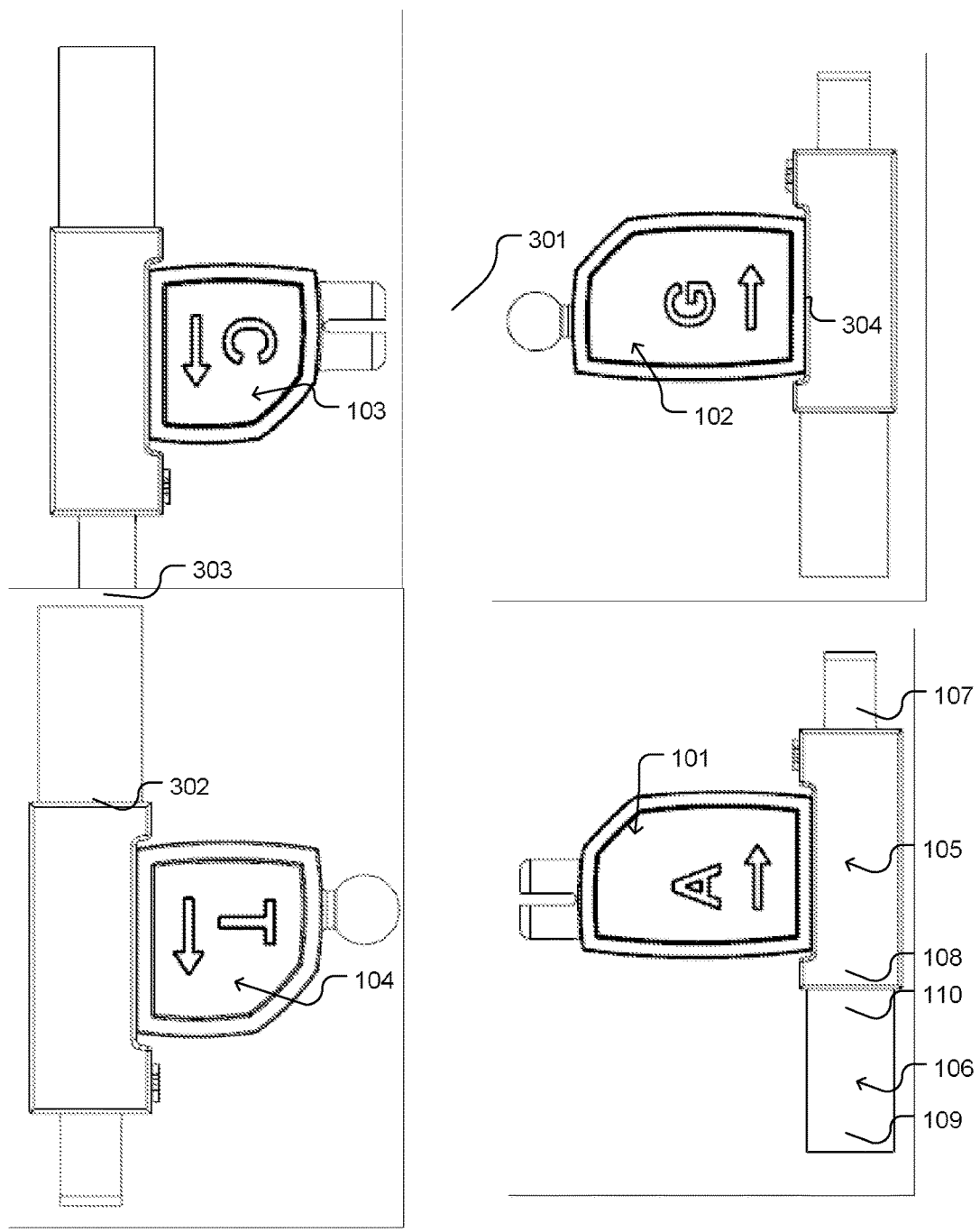
FIG. 3 is an exploded view of the same four exemplary building blocks as in FIG. 2 arranged to demonstrate how the building blocks may be coupled together.

FIG. 3 is an exploded view of the same four exemplary building blocks as in FIG. 2 arranged to demonstrate how the building blocks may be coupled together. In FIG. 3 are shown building block models 101, 102, 103, 104, each representing a different nucleotide, arranged to demonstrate how the building blocks may be coupled together. In some embodiments, there are five different base portion sub-blocks, representing the five bases of adenine 101, thymine 104, guanine 102, cytosine 103, and uracil. Base portions for the different nucleotides each have their own unique color and shape so that they may be easily identified visually. In this embodiment, the base portions for adenine 101, thymine 104, guanine 102, cytosine 103 are colored yellow, red, blue, and green, respectively, although any other combination of colors may be used. Although the colors and shapes render the need for identifying letters or other markings moot, building sub-blocks may nevertheless include markings identifying the specific base (e.g., "A" for adenine), for further educational and identification purposes.

In some embodiments, the base portion sub-block for uracil matches the portion sub-block for thymine 104. Furthermore, the uracil and thymine 104 sub-blocks may be colored differently, to ensure accurate and informative assembly of nucleic acid structures separately representing DNA and RNA structural components.

In various embodiments, sub-blocks representing purine and pyrimidine bases have different sizes. For example, sub-blocks representing purines, such as guanine 102 or adenine 101, can be longer (in a direction along the backbone axis) than those blocks representing pyrimidines, such as cytosine 103, thymine 104, or uracil. The different lengths encourage users to pair purines with pyrimidines to create a uniform sugar-phosphate backbone for a double-stranded nucleic acid structure. Additionally, when the user attempts to replicate macromolecular processes, such as tRNA translation, mRNA transcription, and DNA replication, the sugar-phosphate backbones and the base pairs are evenly spaced throughout the model.

In an embodiment of the invention, there are four main bonds represented. These bonds include the base bonds 301, the 5' sugar-phosphate backbone bond 302, the 3' sugar-phosphate backbone bond 303, and the base-sugar bond 304. The base bond 301 represents a hydrogen bond between two base pairs, 102, 103, and, in an embodiment, is weaker than the other bonds represented in the building block model of a nucleic acid structure. The base portion 101 connects to the sugar portion 105 in a detachable manner. The sugar portion 105 includes a 3' end 107 and a 5' end 108, both of which can connect to different ends of the phosphate group 106 portion. The 5' end of the sugar portion 108 is permanently bonded to the phosphate group portion 106 upon initial assembly by the user through the backbone coupler 110. The permanent attachment does not require glue or a material external to the contents found in the kit. The 3' end of the sugar portion 107 is reversibly bonded to the phosphate group portion 106 through the backbone coupler 109. The sugar-phosphate bonds 302, 303 represent covalent bonds and, in an embodiment, are stronger than the hydrogen bonds found in base-base bonding 301. This strength differentiation can be felt by a user upon interacting or properly assembling the nucleic acid structure.

Figure 4:
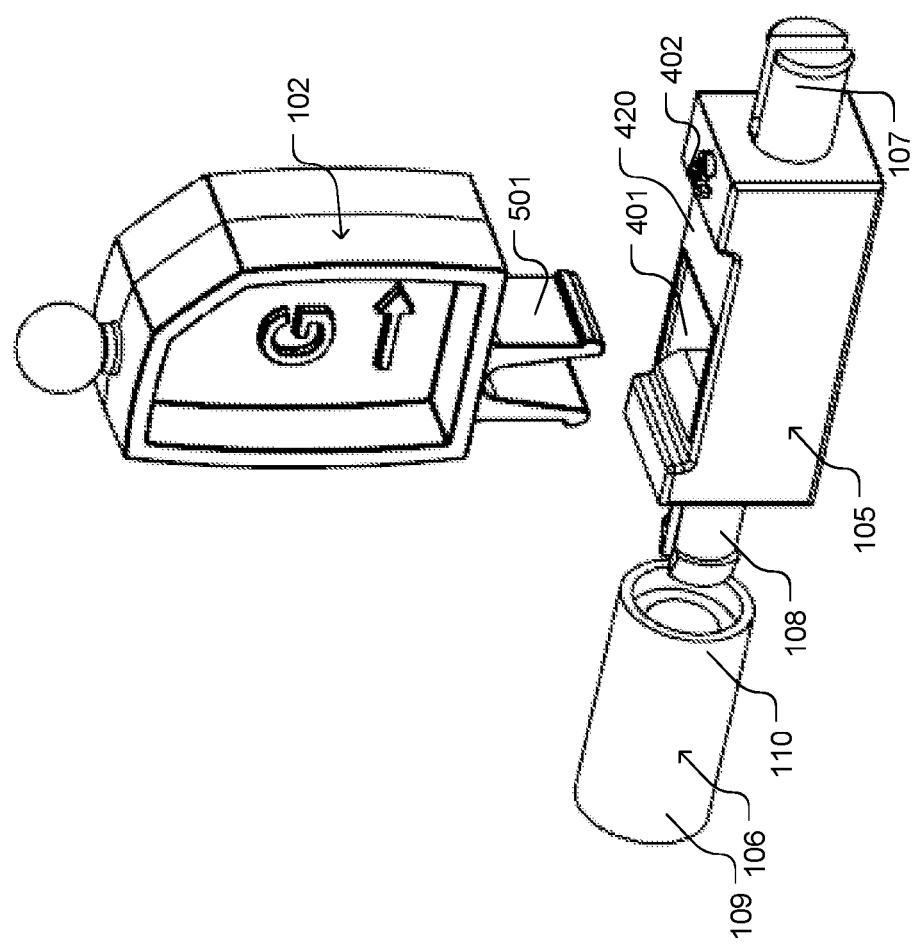
FIG. 4 is an exploded view of one of the exemplary building blocks of FIG. 2 that represents a nucleotide having a base of guanine, the block including portions corresponding to the sugar portion, phosphate group portion, and base portion of the nucleotide.

FIG. 4 is an exploded view of one of the exemplary building blocks of FIG. 2 that represents a nucleotide having a base of guanine, the block including portions corresponding to the sugar portion 105, phosphate group portion 106, and base portion 102 of the nucleotide.

The sugar portion 105 has a straight male backbone coupler at the 3' end 107 and a straight male backbone coupler at the 5' end 108. The 3' end 107 joins reversibly, but tightly, to one end 109 of a phosphate group portion 106 with an annular cantilever snap-fit with a flexible shaft and rigid hub. The 5' end 108 joins permanently to the second end 110 of the phosphate group portion 106. A variety of geometrical features can be used to achieve the differences in strength of the bonds between the sugar portion 105 and the phosphate group 106, such as differently angled couplers.

In other embodiments, the sugar portion 105 has one male and one female coupler which can couple to a phosphate group portion 106 with one male and one female coupler. This allows the user to couple multiple phosphate group portions between sugar portions.

In various embodiments of the invention, at least one of the 5' or 3' ends of the sugar are indicated with raised or recessed numbers 402 on the sugar portion 105. In various embodiments, the two cantilever beams on the male backbone coupler 107, 108 can be angled to create a different strength backbone coupler bond.

Additionally, there is an asymmetrical female-base sugar coupler 401 on the body of the sugar portion 105 which attaches to the male coupler 501 on the bases in FIGS. 5, 7, 9, and 11 501 with a cantilever snap fit. The asymmetry prevents improper assembly of a base-sugar connection and ensures proper directionality of the base portion. In various embodiments, the surface 420 of the sugar portion 105 is also recessed to further prevent improper assembly between the base and the sugar.

In various embodiments, the kit includes two differently colored sugar portions 105 to differentiate between sugars used for DNA structures and processes and those used for RNA structures and processes. The structure of the sugar portions are identical, such that the other pieces in the kit still fit together with the base 102 and phosphorous portions 106.

The phosphate group portion 106 has two female backbone couplers 109, 110. The backbone couplers 109, 110 link to the opposite gender backbone couplers 107, 108 on the sugar portion building block 105 to form the phosphate-sugar backbone. The phosphate-sugar backbone comprises an annular cantilever snap-fit with a flexible shaft and rigid hub, as shown in FIG. 2. In other embodiments, couplers 107, 109; 108, 110 join as a snap-friction fit. Additionally, the female backbone couplers of the phosphate groups 109, 110 are asymmetrical, such that the 3' end 107 of the sugar portion building block can be joined tightly, but reversibly to one connector 109 of the phosphate group. Only one end 110 of the phosphate group 106 can join permanently to the 5' end 108 of the sugar 105.

In various embodiments, the phosphate couplers 109, 110 are angled instead of straight, which alters the strength of the backbone coupler connection with two sugar portion couplers 107, 108.

Figure 5:
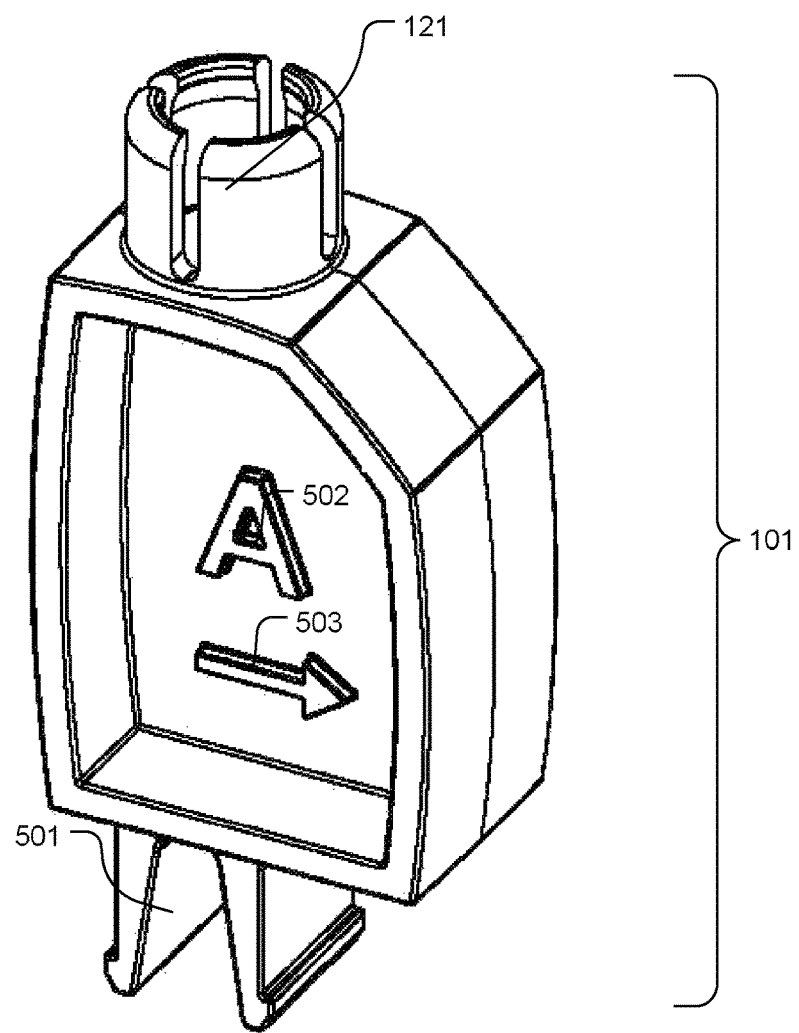
FIG. 5 is a perspective view of an exemplary sub-block, representing an adenine base portion of what we will call a first nucleotide shown in FIG. 2, which includes a four tapered cross-section cantilever female base coupler.

FIG. 5 is a perspective view of an exemplary sub-block, representing an adenine base portion of what we will call a first nucleotide shown in FIG. 2, which includes a four tapered cross-section cantilever female base coupler 121. The female base coupler 121 is configured to interlock with the male coupler 122 on the sub-block depicted in FIG. 7. In various embodiments, portions corresponding to a purine and to a pyrimidine are shaped so that the two portions could be coupled when in isolation but when in part of a modeled DNA structure are prevented from doing so by their differing widths. This coupling between base portions represents the hydrogen-hydrogen bond formed between base pairs 101, 104, as shown in FIGS. 2 and 3. The building block also includes a male base-sugar coupler 501 adapted to interlock with a sugar portion 105, as depicted in FIGS. 14 and 16. In this embodiment, the male base-sugar coupler 501 has a rectangular tapering cross section that connects with the sugar portion via a cantilever snap fit, although other mechanisms of interlocking may be used.

In some embodiments, the base portion is marked with a letter 502 indicating the representative base. For example, a sub-block representing adenine is marked "A" in a raised, capital letter 502. Furthermore, the sub-block has a raised arrow 503 in the center of the sub-block, indicating the directionality of the nucleic acid structure. The arrows 503 indicate proper positioning of the base in the assembled nucleic acid structure and allow users to understand directionality when modelling processes such as DNA replication, mRNA transcription, and tRNA translation. Additionally, the arrows indicate anti-parallel nucleotide construction in double-stranded nucleic acid structures.

Figure 6:
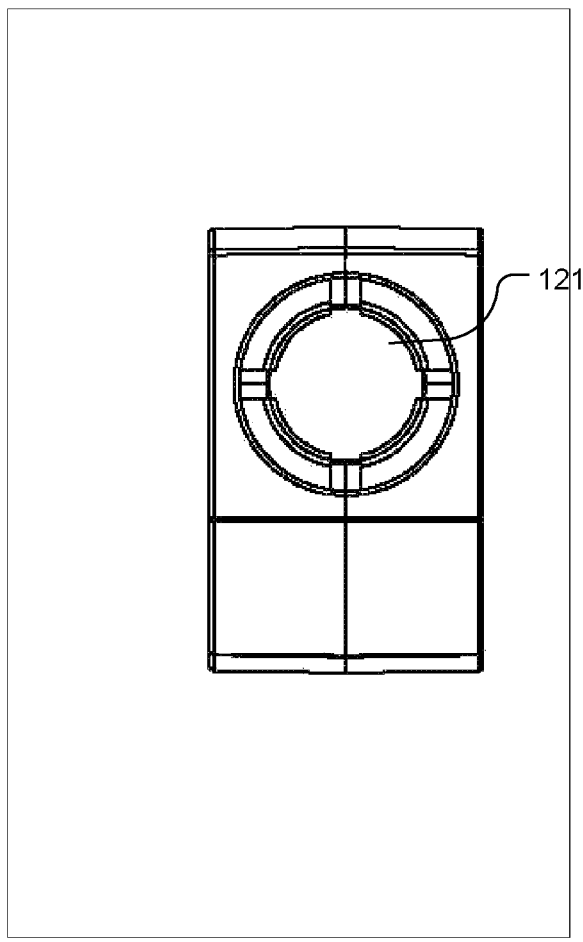
FIG. 6 is a top view of the sub-block depicted in FIG. 5.

FIG. 6 is a top view of the sub-block depicted in FIG. 5. The four tapered cross-section cantilever female base coupler 121 is located on the top of the sub-block depicted in FIG. 5 on the opposite side of the base-sugar coupler. The female base coupler 121 couples to a male base coupler 122 as depicted in FIGS. 7 and 8 to represent hydrogen-hydrogen bonding with a ball-and-socket joint.

A variety of female base couplers can be used as the female base coupler on the base block. In some embodiments, the female base coupler 121 has six cantilever beams instead of four cantilever beams. In other embodiments, the female base coupler 121 is angled instead of straight. Different geometries of female base couplers can pair with different geometries of male base couplers, further preventing the user from incorrectly coupling base pairs. Additional cantilever beams produce a weaker bond and can help the user understand the strength difference between the hydrogen-hydrogen bonds between bases and the covalent bonds in the sugar-phosphate backbone 130, as depicted in FIG. 2.

Figure 7:
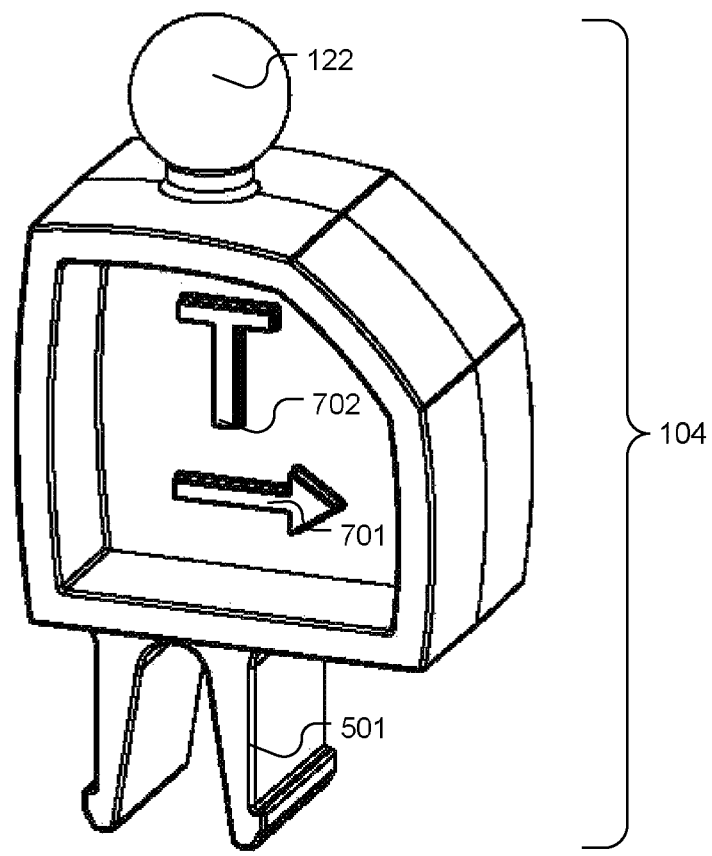
FIG. 7 is a perspective view of another sub-block, representing a thymine base portion of what we will call a second nucleotide shown in FIG. 2 (that pairs with the first nucleotide having the adenine base portion of FIG. 5), which includes a male base coupler adapted to interlock with the four tapered female base coupler of the sub-block depicted in FIG. 5.
Figure 8:
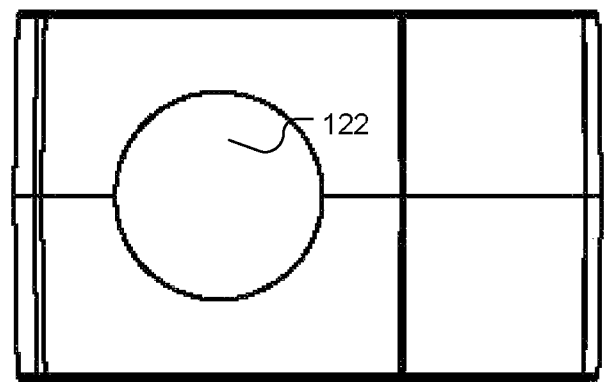
FIG. 8 is a top view of the sub-block depicted in FIG. 7.

FIG. 7 is a perspective view of another sub-block, representing a thymine base portion of what we will call a second nucleotide shown in FIG. 2 (that pairs with the first nucleotide having the adenine base portion of FIG. 5), which includes a male base coupler 122 adapted to interlock with the four tapered female base coupler 121 of the sub-block depicted in FIG. 5. The sub-block has a raised arrow 701 and an alphanumeric character 702 to indicate directionality of the nucleotide and distinguish the sub-block from other nucleotide bases, as explained in FIG. 5. FIG. 7 depicts a male base-sugar coupler 501 identical to those in FIGS. 5, 9, and 11.

Figure 9:
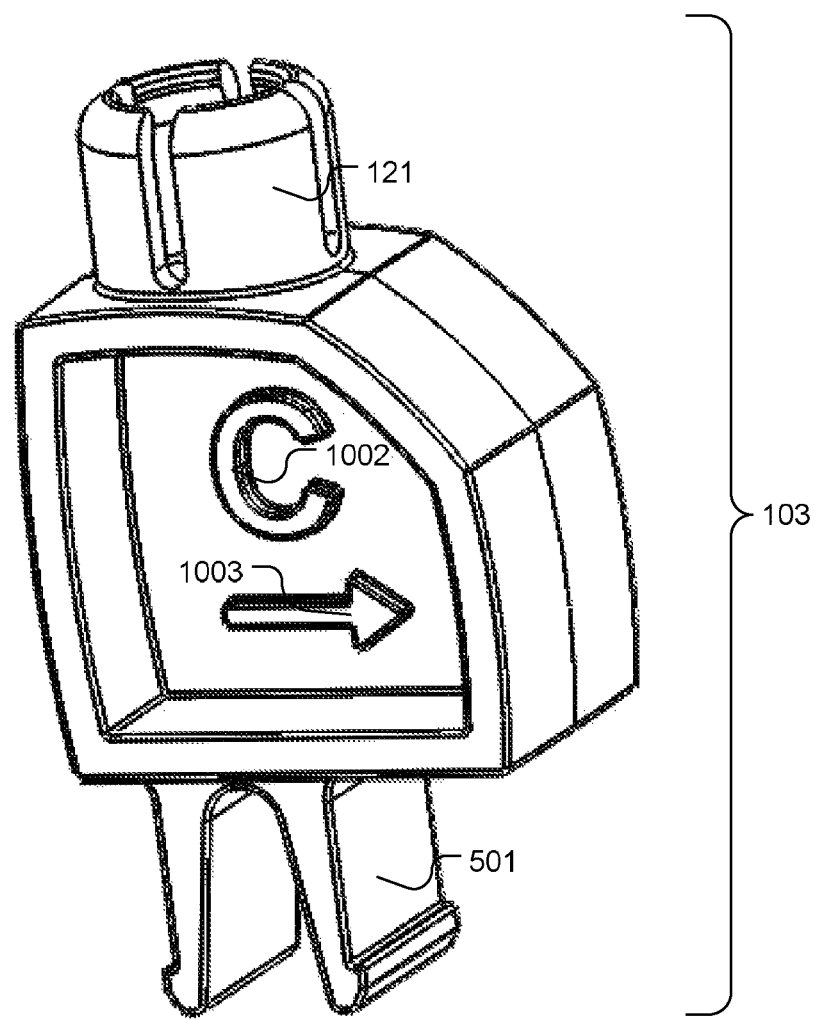
FIG. 9 is a perspective view of an exemplary sub-block, representing a cytosine base portion of what we will call a third nucleotide shown in FIG. 2, with a four tapered cross-section cantilever female base coupler.
Figure 11:
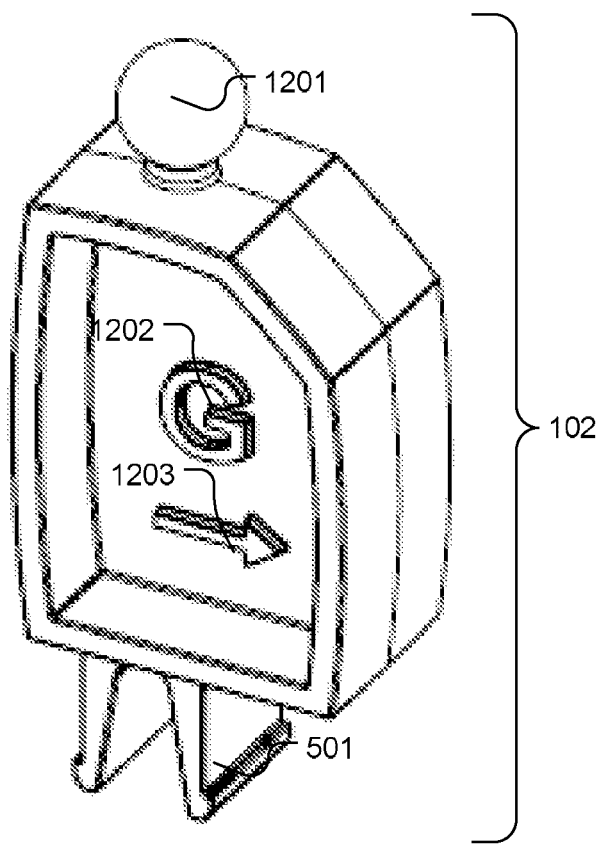
FIG. 11 is a perspective view of an exemplary building sub-block, representing a guanine base portion of what we will call a fourth nucleotide shown in FIG. 2 (that pairs with the third nucleotide having the cytosine base portion of FIG. 9), which includes a male base coupler adapted to interlock with the four tapered female base coupler of the building sub-block depicted in FIG. 9.

In an embodiment, the width of a type of base sub-block is short to represent a pyrimidine building block. Pyrimidine building blocks, as depicted in FIGS. 7 and 9, couple to purine building blocks, as depicted in FIGS. 5 and 11, in a proper double-stranded nucleic acid structure. The blocks interlock in such a way to model parallel sugar-phosphate backbone structures when pyrimidine bases are bonded to purine bases.

FIG. 8 is a top view of the sub-block depicted in FIG. 7 with a male base coupler 122.

FIG. 9 is a perspective view of an exemplary sub-block, representing a cytosine base portion of what we will call a third nucleotide 103 shown in FIG. 2, with a four tapered cross-section cantilever female base coupler 121, which interlocks with the block 102 depicted in FIG. 11 Both the gender of the base coupler and the short width of the base portion sub-block indicate that it should pair with the opposite-gendered, wide FIG. 11 sub-block. This base portion sub-block has a male base-sugar coupler 501 identical to that in FIGS. 5, 7, and 11. In various embodiments, this base portion sub-block can be further differentiated from other sub-blocks by color and alphanumeric character 1002, as was also previously demonstrated in FIG. 5. Additionally, directionality of the nucleotide can be indicated through a raised arrow 1003.

In an embodiment, the width of a type of base sub-block is short to represent a pyrimidine building block. Pyrimidine building blocks couple to purine building blocks in a proper double-stranded nucleic acid structure. The blocks interlock in such a way to form parallel sugar-phosphate backbone structures when pyrimidine bases are bonded to purine bases. Furthermore, only one pyrimidine building sub-block, selected from the nucleic acid bases of cytosine, thymine, and uracil, and one purine sub-block, selected from the nucleic acid bases of guanine and adenine, have a first gendered base coupler, where the other purine block and pyrimidine blocks have a second gendered base coupler. In an embodiment of the invention, both thymine and uracil have the same gendered coupler. Both the width and the affixed coupler make it impossible for the user to assemble a double stranded nucleic acid structure with improper base pairings. If the user attempts to assemble a nucleic acid structure with incorrect pairings, the backbone of the nucleic acid structure could not connect in a straight fashion. Furthermore, the two male or two female couplers would not be able to mate with each other in the structure and the bases would not be connected with the backbone in an antiparallel construction.

Figure 10:
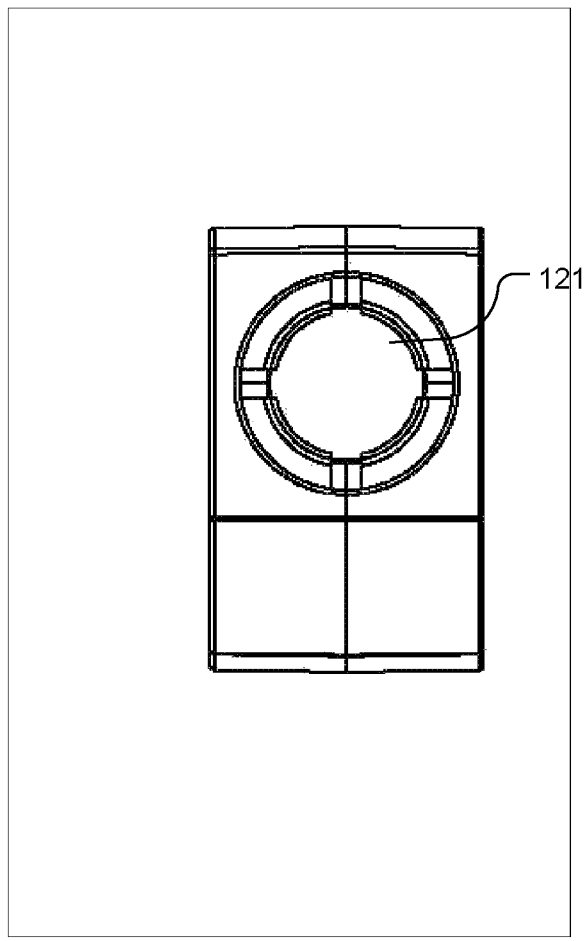
FIG. 10 is a top view of the sub-block depicted in FIG. 9.

FIG. 10 is a top view of the sub-block 103 depicted in FIG. 9.

FIG. 11 is a perspective view of an exemplary building sub-block, representing a guanine base portion of what we will call a fourth nucleotide 107 shown in FIG. 2 (that pairs with the third nucleotide having the cytosine base portion of FIG. 9), which includes a male base coupler 1201 adapted to interlock with the four tapered female base coupler of the building sub-block 121 depicted in FIG. 9. This base portion sub-block has a male base-sugar coupler 501 identical to the couplers in FIGS. 5, 7, and 9. In various embodiments, this base sub-block 102 can be further differentiated from other sub-blocks by color and alphanumeric character 1202, as was also previously demonstrated in FIG. 5. Directionality can also be indicated through a raised arrow 1203, as in FIG. 5.

A wide variety of geometries can be used for male base couplers to couple with female base couplers, as described in FIG. 6. The male base couplers can have a wider or smaller circumference, based on the size of the female couplers. Furthermore, the male base couplers can be angled to fit within certain female base couplers. Additionally, the male base coupler used for sub-block 102 need not be identical to the male base coupler on building block 104.

Figure 12:
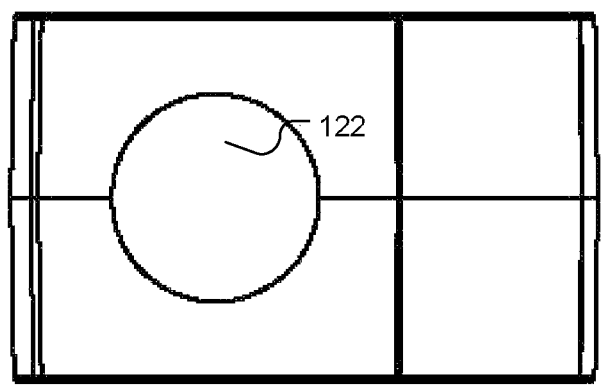
FIG. 12 is a top view of the sub-block depicted in FIG. 11.

FIG. 12 is a top view of sub-block 102, depicted in FIG. 11.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A kit of educational building blocks that can be assembled to model a nucleic acid structure, the kit comprising:

a plurality of educational building blocks, including at least first, second, third, and fourth building blocks, wherein each building block is a structure corresponding to a nucleotide and having visually distinct portions thereof corresponding to (i) a base portion selected from the group comprising adenine, guanine, thymine, and cytosine; (ii) a sugar portion; and (iii) a phosphate group portion;

wherein: (a) the sugar portion has two ends corresponding to a 3' end and a 5' end, (b) the phosphate group portion has two ends, and (c) the end of the sugar portion corresponding to the 5' end can be permanently affixed to a first end of the phosphate group portion;

wherein (d) the end of the sugar portion corresponding to the 3' end includes a backbone coupler of a first gender and (e) the second end of the phosphate group portion includes a backbone coupler of a second gender, the two backbone couplers sharing a common longitudinal axis, so that the first and second building blocks can be removably interlinked by using a backbone coupler of the first gender of the first building block to mate with a backbone coupler of the second gender of the second building block to model a sugar-phosphate backbone, the mated backbone couplers configured to permit rotational motion about the longitudinal axis;

wherein the portion corresponding to the base has a base coupler of a first gender when the base portion corresponds to guanine or thymine and a second gender when the base portion corresponds to adenine or cytosine, and the base portions and base couplers are configured so that the two bases of the second and third building blocks can be removably coupled in a direction transverse to the longitudinal axis of each of the second and third building blocks, and so that the two bases can remain coupled when their respective building blocks are subject to some rotational motion about their respective longitudinal axes;

wherein each base portion has a width in the transverse direction, the base portions corresponding to adenine and guanine have a first width, and the base portions corresponding to thymine and cytosine have a second width; so that when the first and second building blocks are interlinked to model a pair of sugar-phosphate backbones, the differing widths and the base couplers are configured so that the base portion in the first building block, when corresponding to thymine, can be coupled with a base portion in the third building block, when corresponding to adenine, and the base portion in the second building block, when corresponding to guanine, can be coupled with the base portion in the fourth building block, when corresponding to cytosine, but wherein coupling of these base portions in any other pairing of base portions is not possible; and wherein the backbone couplers and the base couplers are configured, under such conditions, so that when the first and second building blocks are interlinked to model a first sugar-phosphate backbone and the second and third building blocks are interlinked to model a second sugar-phosphate backbone, and are arranged so that opposed base portions of the first and third building blocks and of the second and fourth building blocks are coupled using the base couplers, then the building blocks model a double stranded nucleic acid structure.

2. A kit according to claim 1, wherein the backbone couplers are snap-fit couplers at least in part.

3. A kit according to claim 1, wherein the base couplers are configured as a ball-and-socket with a snap fit.

4. A kit according to claim 1, wherein the backbone couplers and the base couplers are configured so that the disassembly force of the backbone couplers is more than triple the disassembly force of the base couplers.

5. A kit according to claim 1, wherein the base portion and the sugar portion are discrete components and the base portion is coupled to the sugar portion by a cantilevered snap fit.

6. A kit according to claim 1, wherein the base portion group further comprises uracil.

7. A kit according to claim 6, wherein the uracil base portion has dimensions and coupling mechanisms that are equivalent to those of the thymine base portion.

8. A kit according to claim 6, wherein the kit is configured to model both single and double stranded nucleic acid structures.

\* \* \* \* \*